Nov. 18, 1941.                W. D. JOHNSTON, JR                2,263,213
                                RESIN COMPOSITION
                               Filed April 12, 1940
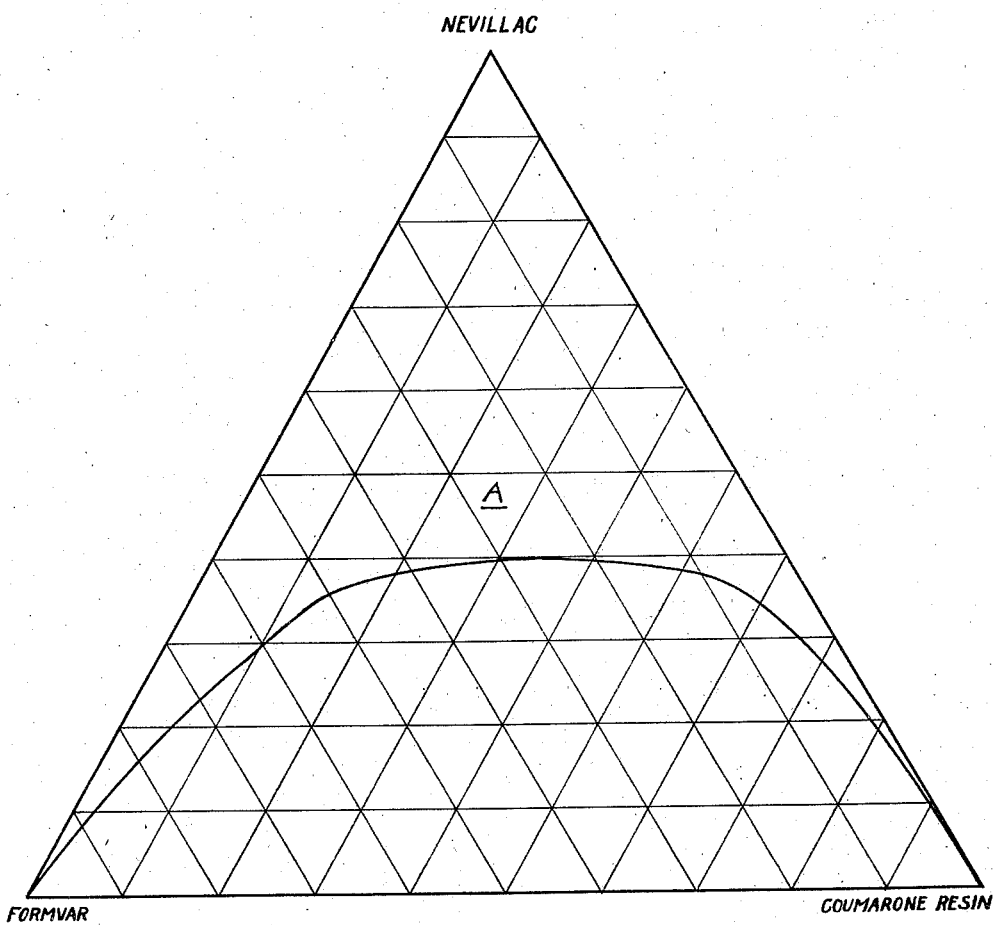
WITNESSES                                                        INVENTOR.

Patented Nov. 18, 1941

2,263,213

UNITED STATES PATENT OFFICE 2,263,213

RESIN COMPOSITION

William D. Johnston, Jr., Bellevue, Pa., assignor to The Neville Company, Pittsburgh, Pa., a corporation of Pennsylvania Application April 12, 1940, Serial No. 329,305

7 Claims. (Cl. 260—42)

This invention relates to improvements in blending polyvinyl acetals with other resinous bodies with which they are normally incompatible.

It is among the objects of the invention to provide resin compositions combining satisfactory thermoplastic properties with unusual toughness and elasticity.

Another object is to provide blends of polyvinyl acetals and resins normally incompatible therewith, by the use of polymers produced by polymerization and concurrent phenolic involvement of the polymerizable constituents of crude solvent naphtha, particularly phenol-modified coumarone resins.

A specific object is to provide compositions containing ordinary coumarone resin and polyvinyl acetals, which are homogeneous and possess physical properties which render them desirable in the arts.

Other objects will appear from the following description.

The so-called coumarone resins, sometimes called coumarone-indene or paracoumarone-indene resins, are produced by polymerization of certain constituents of crude solvent naphtha produced in the by-product coking of coal. The polymerizable constituents of such naphthas are commonly coumarone and indene and their homologs, which are present in amounts and proportions which depend upon the proximate source from which the naphthas are derived as well as upon the operating conditions by which the naphthas are produced. Such naphthas may contain also other polymerizable constituents, such as dicyclopentadiene. Depending upon such factors as well as upon treatments of the naphtha to fractionate the polymerizable constituents more or less completely, the polymers produced may thus comprise predominantly polycoumarone or polyindene, or mixtures of both, or polymers of the other polymerizable constituents alluded to. Commonly the commercial resins resultant from crude solvent naphtha are considered as being mixtures of coumarone and indene polymers. For brevity reference will be made herein to coumarone resin but from what has been said it will be understood that the term contemplates the class of resins producible from crude solvent naphtha produced in the by-product coking of coal. As understood in the art, such resins may be soft or hard, depending on the relative proportions of the lower and higher polymers.

Coumarone resins possess properties which render them valuable for many purposes. In particular, their resistance to water, acids, and alkalies coupled with their thermoplastic nature provides a combination of properties desirable in molding plastics. These resins have not found extensive application for such purposes, however, because of their inherent brittleness and low strength, and, in general, plasticizing, or tempering, of the coumarone resins to adapt them to thermoplastic molding has been difficult to achieve in a completely satisfactory manner. For instance, some materials must be used in large amounts to provide the necessary toughness and strength, while the properties of others are such that the mixtures do not provide to the fullest extent the desirable properties of the coumarone resin. The polyvinyl acetals possess properties such that, other things being equal, they might be compounded with coumarone resin without detriment to its desirable properties, but it has not heretofore been possible to use them with ordinary coumarone resins of commerce because the two are incompatible.

I have discovered, and it is upon this that my invention is predicated in part, that phenol-modified coumarone polymers are, in contrast with ordinary coumarone resins, highly compatible with polyvinyl acetals with production of homogeneous thermoplastic compositions of unusual toughness and elasticity, and that very small amounts of the polyvinyl acetal suffice for the purposes of the invention. The harder grades of phenol-modified coumarone resins are similar to ordinary, or unmodified, coumarone resins to the extent that they are highly brittle and of low strength, but for some reason not fully apparent, the phenolic involvement of the former confers compatibility with polyvinyl acetals.

The term "polyvinyl acetals" is used herein and in the claims in its customary sense to mean that group of products resulting from reaction between polyvinyl alcohols and aldehydes such as formaldehyde, acetaldehyde, propionaldehyde, butyraldehyde, and the like, as well as the aromatic aldehydes such as benzaldehyde and the like. Embraced in this class are the variants of this basic type, which are differentiated by, for example, viscosity or per cent hydrolysis, as produced commercially by the manufacturers of these resins or resinoids. Various resins of this class have been investigated in connection with the present invention such, for example, as a polyvinyl alcohol-formaldehyde condensate produced from polyvinyl acetate having a viscosity of 15 centipoises when dissolved in benzene to form a "molal" solution based on the molecular weight of the vinyl acetate monomer, the acetate being hydrolyzed to convert about 70 per cent of the acetate groups to hydroxyl groups. This resin is sold by the Shawinigan Products Corporation as "Formvar 15–70." Another resin of this class applicable in the practice of this invention is the polyvinyl alcohol-acetaldehyde condensate produced from a polyvinyl acetate having a viscosity, in molal solution in benzene, of 11 centipoises and hydrolyzed to the extent of about 80 per cent. This is sold by the same company as "Alvar 11–80." As far as I have been able to determine, all these polyvinyl acetals are applicable in the practice of the invention.

Phenol-modified coumarone resins are those produced from the polymerizable constituents of crude solvent naphtha by polymerization with concurrent involvement with a phenolic body. Various procedures are available for the production of such phenol-modified coumarone resins, such as that described in German Patent No. 302,543. An improved procedure is disclosed in Patent No. 2,077,009, granted April 13, 1937, to Joseph Rivkin, in accordance with which phenol-modified coumarone resin is produced by effecting the polymerization, in the presence of a phenolic body, such as cresols, phenols, naphthas, and the like, which is reactive with the polymerizable constituents in the naphtha, by means of activated clay and with moderately elevated temperatures, for instance, in the neighborhood of 100° C., the reaction body being agitated during the course of the reaction.

Still another improved procedure for the production of phenol-modified coumarone resin is described in United States Letters Patent No. 2,156,126 granted April 25, 1939, on an application filed by Joseph Rivkin. As disclosed therein, the phenolic involvement is achieved through the conjoint use of a sulfuric acid base catalyst and a phenolic reagent in a quantity by weight not less than about 22 per cent of the weight of the polymerizable constituents of the crude solvent naphtha. During the progress of the reaction the reacted body is agitated and its temperature is maintained below about 60° C., most suitably within the range 25° to 35° C. The term "sulfuric acid base catalyst" is used in this instance to refer concisely to concentrated sulfuric acid or derivatives thereof obtained by the substitution of at least one hydrogen atom or one hydroxyl group of the sulfuric acid by an aliphatic or an aromatic group which may, in turn, be substituted by other groups, such as hydroxyl groups, amine groups, and the like. This latter procedure results, in general, in products having a lower acid number than characterizes the phenol-modified resins produced by the procedures referred to hereinabove.

Depending upon the manner in which the phenolic involvement is accomplished, there is produced polymerized material in the form of a more or less soft or oily body which may be separated, as by steam distillation, into hard resins, comprising chiefly higher polymers, and more or less soft or fluid resins, comprising chiefly lower polymers and in the trade termed phenolic heavy oil by analogy to the similar heavy oil produced through fractionation of the product of ordinary polymerization of the reactive bodies in crude solvent naphtha. Both fractions are phenolically modified, and both may be used in the practice of the present invention. As appears from the foregoing patents, it is characteristic of such phenol-modified coumarone resins that they are alcohol soluble.

I have discovered furthermore that not only are phenol-modified coumarone resin and phenol-modified heavy oil satisfactorily compatible with polyvinyl acetals, but also that such binary compositions are capable of blending compatibly with resins which are incompatible with polyvinyl acetals but are compatible with phenol-modified coumarone resin, with production of three-component blends having desirable properties. In other words, resins incompatible with polyvinyl acetals but compatible with phenol-modified coumarone resins and heavy oil, are compatibly blendable with the two to provide three-component blends, and although the three components may not in each instance be compatible in all proportions the range of compatibility and the properties of the blends are such as to be commercially desirable, especially because it is thereby possible to compound polyvinyl acetals with resins that could not be used satisfactorily therewith heretofore. For instance, it is possible in this manner to compound ordinary coumarone resin with polyvinyl acetals which, so far as we are aware, has not been accomplished heretofore.

Referring first to the simple blending of phenol-modified coumarone resin and heavy oil with polyvinyl acetals, very small amounts of the latter suffice to effect radical changes in the characteristics of the former. In fact, mixes of phenol-modified coumarone resin with as little as 5 to 10 per cent of polyvinyl acetal possess physical properties so different from those of the individual materials that observation of the blend does not enable one having no knowledge of its constituents to judge their presence. Smaller amounts than those stated, e. g., as little as 1 per cent, might be used but generally a minimum of about 5 per cent of polyvinyl acetal is needed to confer good toughness and strength. Larger amounts may be used, but partly for reasons of economy it is desirable in general to use not more than about 50 per cent of polyvinyl acetal.

Such mixes are suitably thermoplastic, tough and strong for molding purposes. The melting point of the blends may be higher than that of the phenol-modified resin. This is indicated by, for example, a blend of 80 per cent of phenol-modified coumarone resin of 85° to 95° C. melting point sold as "Nevillac" by The Neville Company, of Pittsburgh, Pennsylvania, and 20 per cent of a polyvinyl acetal sold by Shawinigan Products Corporation as "Formvar." The resultant mix had a cube in mercury softening point of 103° C., and a melting point of 131° C. This blend is tough and hard, it does not powder upon fracture, it shows no surface tack or cold flow, and between the molten and solid states it is gummy and elastic. Also, it is soluble in 60:40 toluol-isopropyl alcohol.

The characteristics of blends produced in accordance with the invention may be exemplified by the following actual compositions, considering that just described as Example 1.

*Example 2.*—This blend comprised 10 grams of "Formvar" 15–70 grade and 20 grams of phenol-modified coumarone-indene heavy oil of about 5° to 10° C. melting point. The blend is tough, horny, elastic and non-brittle, and it is free from tack and cold flow. Repeated hammering is required to break a cooled slab, and when broken it exhibits a fibrous fracture. It is soluble in a mixture of toluol and isopropyl alcohol in the proportions of 60 parts of the former to 40 parts of the latter. Its softening point by the cube in mercury test is 82.5° C., and its melting point 105° C.

*Example 3.*—This blend comprised equal parts by weight of the ingredients used in Example 2. It was made by heating the phenol-modified heavy oil and agitating it while adding the polyvinyl acetal in small quantities. After about two-thirds by weight of the vinyl acetal had been added the material was no longer a mobile fluid, even at 200° C., and mixing became more of a milling operation, and when all of the vinyl acetal had been added the mass rode around on the propeller shaft. During the blending there was a pronounced odor of both phenol and acetic acid. When cooled the blend was light brown-yellow in color, extremely tough and horny. It could not be broken by repeated sharp blows in thick sections, and in thin sections it possessed striking toughness and ductility, it being possible to bend and twist such sections repeatedly without fracture. The surface is free from tack. The blend was practically insoluble in toluol, it could not be remelted to a liquid although it softened to a workable plastic upon heating. The cube in mercury softening point was 116.5° C., and the melting point 147° C. The properties of this material adapt it to low pressure injection molding, or for other molding purposes with mineral or organic fillers.

*Example 4.*—In this blend the same materials were used as in blends 2 and 3 in the proportion of 90 per cent by weight of phenol-modified heavy oil and 10 per cent by weight of polyvinyl acetal. This material was rubbery, tacky, and extremely elastic with good return after deformation. The cube in mercury softening point was 36° C., and the melting point 47° C.

As stated hereinabove, I have discovered further that the use of phenol-modified coumarone resin or heavy oil makes it possible to produce compatible three-component blends of polyvinyl acetal and resins compatible with the former but not with the latter material. As exemplifying this aspect of the invention, reference may be made to blends made from "Nevillac" phenol-modified coumarone resin, "Formvar," 15–70 grade, and various other resins which are not alone compatible with the "Formvar" resin. In these tests there was made up a base mix of 8 parts of phenol-modified coumarone resin and 2 parts of the stated polyvinyl acetal, and to portions of this base mix there were added progressively increasing amounts of the third component to ascertain the limits of compatibility of the latter. The solubilizing action of phenol-modified coumarone resin upon these mutually incompatible materials is shown in the following table:

| "Nevillac" | "Formvar" | Other resin | |
|---|---|---|---|
| | | Maximum percent compatible | Type and source |
| Percent | Percent | | |
| 50 | 12.5 | 37.5 | Nevillite #2 (hydrogenated coumarone resin, The Neville Company). |
| 33.3 | 8.3 | 58.3 | Ester gum (glycerol-rosin ester). |
| 33.3 | 8.3 | 58.3 | "Q" Resin (cyclopentadiene, The Neville Company). |
| 59.3 | 14.8 | 25.9 | Santo (petroleum resin, Monsanto Chemical Company). |

Similar results are attainable with other resins compatible with the phenol-modified coumarone resin but not compatible with the polyvinyl acetals. This aspect of the invention is exemplified particularly well by the blending of ordinary coumarone resin with polyvinyl acetal. By the use of phenol-modified coumarone resin and heavy oil in accordance with the invention it is possible to provide homogeneous blends containing very large amounts of ordinary coumarone resin through the use of very small amounts of polyvinyl acetal, while attaining desirable plastic and physical properties. For instance, as little as 1 or 2 to 10 per cent of polyvinyl acetal suffices for the purposes of the invention; larger amounts may be used, of course, to produce particular properties. The results obtained with widely varying grades of coumarone-indene resin made by The Neville Company, of Pittsburgh, Pennsylvania, and with phenol-modified heavy oil are exemplified by the following blends.

*Example 5.*—A blend was made from 15 grams of a coumarone-indene resin having a melting point of 112° C., 8.3 grams of phenol-modified heavy oil, and 1.7 grams of the polyvinyl acetal used in the foregoing examples. Although being somewhat brittle and of slight surface tackiness, it was definitely tougher than the coumarone resin from which it was compounded, and it was perfectly homogeneous. The cube in mercury softening point was 56° C., and the melting point was 72° C.

*Example 6.*—This blend was made from equal parts by weight of a coumarone resin having a melting point above 150° C. and the blend described as Example 4, thus providing a composition containing 50 per cent by weight of coumarone-indene resin, 45 per cent of phenol-modified heavy oil, and 5 per cent of vinyl acetal resin. Although somewhat frangible at room temperature, the blend was homogeneous and was much less frangible than coumarone-indene resins of similar melting point. At temperatures of 90° to 100° F. the blend was tough, elastic and ductile, and it could be remelted easily to a thin liquid. Its softening point was 59° C., and its melting point 76° C.

*Example 7.*—This blend was made from equal parts by weight of a hydrocarbon resin which is considered as consisting largely of cyclopentadiene polymers and the blend described as Example 4. It was similar to the composition of Example 6 in its properties, and was of deep red color.

*Example 8.*—This blend consisted of equal parts by weight of a phenol-modified coumarone resin having a melting point of 85° to 95° C. and the blend described as Example 4. It was much tougher than the blends described as Examples 6 and 7, and possessed slight surface tack although much less than coumarone-indene resins of the same melting point. It was very elastic and ductile, and its cube in mercury softening point was 48° C., and its melting point was 62° C.

The accompanying graph illustrates this further with reference to the compatibility of The Neville Company's grade R–1 Nevindene resin, "Nevillac" phenol-modified coumarone resin, and "Formvar." The data for this graph were obtained from mixtures of stock solutions of phenol-modified coumarone-indene resin of about 85° to 95° C. melting point and "Formvar." The phenol-modified resin was dissolved in toluol, and the "Formvar" in a 60:40 mixture of toluol and isopropyl alcohol. These solutions were mixed in proportions to give resin ratios ranging from 9:1 to 1:9 of the phenol-modified resin to "Formvar." To these blends there were added small quantities of a solution (in toluol) of coumarone-indene resin having a melting point above 150° C. Films were flowed from the blends and after they had dried they were examined for clarity, the limits of compatibility being determined by the appearance of opacity. These limits were determined by adding increments of the coumarone resin solution until the film formed showed a cloud when dry, the highest quantity added to yield a clear film being taken as the limit of compatibility. In the triangular graph field A represents the compatible proportions of this tricomponent system, and the ability of the phenol-modified coumarone resin in producing compatible blends is evidenced by the fact that this field encompasses a large proportion of all possible combinations of these three constituents.

Three methods are in general use for the compounding, or blending, of resin compositions. One involves the use of a common solvent, or the blending of two or more resin solutions. The second resides in milling the resins together in a suitable device, thus producing merely mechanical homogenization. The third consists in melting one or more of the resins together with agitation in the molten state to bring about solution or blending. This latter method is, in general, desirable because it eliminates the use of volatile solvents together with the resultantly necessary solvent recovery systems, and the fire and explosion hazards which attend the use of the first procedure; furthermore, it eliminates the rather considerable power costs which may be involved in the application of the second procedure. The fusion method is simple and requires merely a source of heat and means for mechanical agitation, with minimum power consumption.

While in the practice of the invention the materials may be blended in various ways for certain purposes, or within certain proportions, the best results are to be had by first melting the phenol-modified coumarone resin, mixing the melt with the polyvinyl acetal, and agitating until solution of the latter in the former is complete, and then adding the unmodified coumarone or other resin which is normally incompatible with the vinyl acetal resin. In this manner it is possible to produce much higher ratios of ordinary coumarone resin in compatible solution than with other orders of mixing the three ingredients.

Also, the production of homogeneous blends is greatly accelerated as compared with other orders of mixing the three materials.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. As a new composition of matter, a composition comprising alcohol soluble polymer of the polymerizable constituents of crude solvent naphtha produced by polymerization and concurrent phenolic involvement with a phenolic body, and from about 1 to 50 per cent of polyvinyl acetal, said composition being homogeneous.

2. As a new composition of matter, a composition comprising coumarone resin, a phenol-modified alcohol soluble polymer of polymerizable constituent of crude solvent naphtha produced by polymerization and concurrent phenolic involvement with a phenolic body, and at least about 2 per cent of polyvinyl acetal.

3. As a new composition of matter, a composition comprising a major amount of coumarone resin, a resin composed of alcohol soluble polymers of the polymerizable constituents of crude solvent naphtha and produced by polymerization and concurrent phenolic involvement with a phenolic body, and at least about 2 per cent of polyvinyl acetal.

4. As a new composition of matter, a synthetic resin composition comprising alcohol soluble coumarone polymer produced by polymerization of coumarone with concurrent phenolic involvement with a phenolic body, and about 1 to 50 per cent of polyvinyl acetal, the composition being homogeneous and non-brittle.

5. A composition according to claim 4, said coumarone polymer being heavy oil produced in the said polymerization.

6. A thermo-plastic composition comprising alcohol soluble coumarone resin produced by polymerization of coumarone with concurrent phenolic involvement with a phenolic body, and about 1 to 50 per cent of polyvinyl acetal, the composition being homogeneous, thermo-plastic, tough, strong, and substantially non-brittle.

7. As a new composition of matter, a resin composition comprising at least about 2 per cent of polyvinyl acetal, coumarone resin, and alcohol soluble coumarone resin produced by polymerization of coumarone with concurrent phenolic involvement with a phenolic body, said alcohol soluble coumarone resin being present in an amount sufficient to produce a homogeneous and non-brittle composition.

WILLIAM D. JOHNSTON, JR.